US008687132B2

(12) United States Patent
Nakayama

(10) Patent No.: US 8,687,132 B2
(45) Date of Patent: Apr. 1, 2014

(54) DISPLAY DEVICE WITH PARALLAX BARRIER ON SUBSTRATE AND METHOD OF MANUFACTURING THE SAME

(75) Inventor: Akio Nakayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 12/968,697

(22) Filed: Dec. 15, 2010

(65) Prior Publication Data

US 2011/0149218 A1    Jun. 23, 2011

(30) Foreign Application Priority Data

Dec. 21, 2009 (JP) ................................. 2009-289451

(51) Int. Cl.
| | | |
|---|---|---|
| G02F 1/1333 | (2006.01) | |
| G02F 1/1335 | (2006.01) | |
| G02F 1/1337 | (2006.01) | |
| G02F 1/1339 | (2006.01) | |
| G02F 1/1341 | (2006.01) | |
| G02B 27/22 | (2006.01) | |

(52) U.S. Cl.
CPC ...................................... *G02B 27/22* (2013.01)
USPC ............. 349/15; 349/157; 349/158; 349/153; 349/190; 349/191; 356/12

(58) Field of Classification Search
CPC ............................ G02B 27/2214; G02B 27/22
USPC ............. 349/12, 15, 157–158, 153–154, 182, 349/189–190; 356/12
See application file for complete search history.

(56) References Cited

U.S. PATENT DOCUMENTS

| | | | | |
|---|---|---|---|---|
| 7,336,326 | B2 * | 2/2008 | Kim et al. ........................ | 349/95 |
| 7,940,357 | B2 * | 5/2011 | Ahn et al. ..................... | 349/111 |
| 8,262,271 | B2 * | 9/2012 | Tillin et al. ................... | 362/606 |
| 2005/0200781 | A1 | 9/2005 | Takatani | |
| 2005/0243253 | A1 | 11/2005 | Imai et al. | |

(Continued)

FOREIGN PATENT DOCUMENTS

| | | |
|---|---|---|
| JP | 11-95167 | 4/1999 |
| JP | 2005-258016 | 9/2005 |

(Continued)

OTHER PUBLICATIONS

Tomoo Takatani, "Regarding Dual-View LCD" and "Triple-View LCD", Sharp Technical Journal, No. 96, Nov. 2007, pp. 21-23.
Office Action dated Sep. 3, 2013, issued in Japanese Patent Application No. 2009-289451 (with English translation).

*Primary Examiner* — Hoan C Nguyen
(74) *Attorney, Agent, or Firm* — Oblon, Spivak, McClelland, Maier & Neustadt, L.L.P.

(57) ABSTRACT

A method of manufacturing a display device according to one aspect of the present invention is a method of manufacturing a display device including a liquid crystal interposed between a CF substrate and a TFT substrate that are opposed to each other, the method including the steps of: bonding the CF substrate and the TFT substrate each having a mother substrate shape to form a cell substrate from which at least one panel is to be cut out; forming, after formation of the cell substrate, a parallax barrier layer for separating a display image on an outer side of the cell substrate at a side of one of the CF substrate and the TFT substrate; and dividing, after formation of the parallax barrier layer, the cell substrate into at least one panel.

9 Claims, 13 Drawing Sheets

(56) References Cited

U.S. PATENT DOCUMENTS

2009/0086150 A1* 4/2009 Koyama et al. ............... 349/153
2009/0279025 A1* 11/2009 Machidori et al. ............ 349/110
2011/0102732 A1* 5/2011 Washizawa ................... 349/187

FOREIGN PATENT DOCUMENTS

| JP | 2008-8934 | 1/2008 |
| JP | 2011-099880 | 5/2011 |
| WO | WO 2004/011987 A1 | 2/2004 |

* cited by examiner

RELATED ART

DISPLAY DEVICE WITH PARALLAX BARRIER ON SUBSTRATE AND METHOD OF MANUFACTURING THE SAME

INCORPORATION BY REFERENCE

This application is based upon and claims the benefit of priority from Japanese patent application No. 2009-289451, filed on Dec. 21, 2009, the disclosure of which is incorporated herein in its entirety by reference.

BACKGROUND OF THE INVENTION

1. Field of the Invention

The present invention relates to a display device and a method of manufacturing the same, and more particularly, to a display device with a parallax barrier layer, and a method of manufacturing the same.

2. Description of Related Art

In recent years, liquid crystal display devices (LCDs) for displaying an image that varies depending on viewing angles are applied as 3D-LCDs and dual-screen LCDs. A 3D-LCD displays a 3D image using a parallax generated by allowing the viewer's right and left eyes to perceive images seen from different points. Thus, the 3D-LCD is also called a three-dimensional liquid crystal display device (e.g., Japanese Unexamined Patent Application Publication No. 11-95167). Meanwhile, a dual-screen LCD provides two different types of images simultaneously to a plurality of viewers located at different viewing positions. Thus, the dual-screen LCD is also called a dual-view liquid crystal display device (e.g., "Regarding "dual-view LCD" and "triple-view LCD"" written by Tomoo Takatani, Sharp Technical Journal, No. 96, November 2007, pp. 21-23). A triple-screen LCD provides three different types of images simultaneously to a plurality of viewers located at different viewing positions. Thus, the triple-screen LCD is also called a triple-view liquid crystal display device.

In these liquid crystal display devices, angles at which an image is viewed are generally separated by a stripe-shaped parallax barrier pattern formed in a display area. As a method of forming such a parallax barrier pattern, Japanese Unexamined Patent Application Publication Nos. 11-95167 and 2008-8934 (see FIG. 1 of the publication) disclose a method in which, after an LCD is completed, a glass substrate with a parallax barrier having a parallax barrier pattern formed therein is bonded to the completed LCD.

In this method, however, a bonding failure inevitably occurs at a constant rate during the bonding process. Accordingly, it is expected that the LCD, which is a component of high value, becomes defective, resulting in increase in cost. Additionally, it is necessary to accurately align and bond the glass substrate with the parallax barrier for each LCD, resulting in deterioration in productivity.

As a related art modified in view of the above-mentioned problems, there is proposed a method of directly forming a parallax barrier pattern on a substrate constituting an LCD which is disposed on a visible-side or backlight side.

For example, International Patent Publication No. WO 2004/011987 discloses a method of forming a parallax barrier pattern on the outer surface of a panel of a color filter substrate placed on the visible-side. Japanese Unexamined Patent Application Publication No. 2005-258016 discloses a method of forming a parallax barrier pattern on the inner surface of a panel of a color filter substrate placed on the backlight side. Japanese Unexamined Patent Application Publication No. 2008-8934 discloses a method of forming a parallax barrier layer on a substrate of a display device which is a liquid crystal cell serving as a display element body (see FIGS. 9 to 13 of the publication). Specifically, a display device is prepared in advance, and a first parallax barrier layer, a first adhesion layer, and a first glass substrate are stacked on an opposing substrate constituting the display device.

Furthermore, a second parallax barrier layer, a second adhesion layer, and a second glass substrate are stacked on the first glass substrate.

In the method disclosed in International Patent Publication No. WO 2004/011987, however, when the parallax barrier pattern disposed outside the panel is formed using a metallic film such as chromium oxide, which is an ordinary light-shielding film, and then a black matrix pattern disposed inside the panel is formed using the same metallic film, the parallax barrier pattern is also etched during the process for etching the black matrix. Accordingly, it is necessary to separately carry out resist pattern forming and removing processes to protect the parallax barrier pattern. This causes a problem of an increase in the number of steps.

On the other hand, when one of the parallax barrier pattern and the black matrix pattern is formed using a black resin, instead of forming the both patterns using the same metallic film, the use of the black resin makes it difficult to achieve thinning. This causes a problem that it is difficult to apply such a method to a high-definition LCD. Thus, the method disclosed in International Patent Publication No. WO 2004/011987 has problems involving the light-shielding film.

Meanwhile, in the LCD that displays different images depending on viewing angles, it is necessary to set a predetermined distance between one of a liquid crystal layer and a color filter layer, which is located closer to a parallax barrier layer, and the parallax barrier layer to in order to separate a display image into a left side image and a right side image. This distance varies depending on a pitch of LCD pixels and an angle of luminance peaks of the left side image and the right side image. In the case of the dual-screen LCD, the distance is equal to or smaller than about 0.5 mm, e.g., about 0.1 mm or 0.3 mm.

However, when the parallax barrier layer is disposed outside the panel as disclosed in International Patent Publication No. WO 2004/011987, it is necessary to set the thickness of the substrate to about 0.5 mm or smaller. Thus, the substrate strength is insufficient, which makes difficult to manufacture the LCD. In view of this, in the method disclosed in Japanese Unexamined Patent Application Publication No. 2005-258016, after the parallax barrier pattern is formed on the inner surface of the panel of the color filter substrate, a thick resin layer having a thickness of about 0.1 mm or 0.3 mm is formed so as to adjust the distance between one of the liquid crystal layer and the color filter layer and the parallax barrier layer.

When the thick resin layer having a thickness of about 0.1 mm or 0.3 mm is formed on the color filter substrate, however, a warp occurs in the glass substrate due to a stress of the thick resin layer. This may make it difficult to continuously perform the subsequent manufacturing steps. Besides, a crack or a wrinkle may occur in the thick resin layer due to its shrinkage, resulting in deterioration of the display quality. Thus, the method disclosed in Japanese Unexamined Patent Application Publication No. 2005-258016 has problems involving the thick resin layer.

Additionally, in the method disclosed in Japanese Unexamined Patent Application Publication No. 2008-8934, the parallax barrier layer, the adhesion layer, and the glass substrate are formed after the display device is prepared. Accordingly, the productivity thereof is not high. Besides, since two sets of the parallax barrier layer, the adhesion layer, and the glass substrate are stacked, the productivity thereof is not high.

SUMMARY OF THE INVENTION

The present invention has been made to solve the above-mentioned problems, and an object of the present invention is to provide a display device capable of improving the productivity, and a method of manufacturing the same.

A first exemplary aspect of the present invention is a method of manufacturing a display device including a pair of substrates being opposed to each other and having a display material interposed therebetween, the method including the steps of: bonding a first mother substrate and a second mother substrate together to form a cell substrate from which at least one panel is to be cut out; forming, after formation of the cell substrate, a parallax barrier layer for separating a display image on an outer surface of the cell substrate at a side of one of the first and second mother substrates; and dividing, after formation of the parallax barrier layer, the cell substrate into the at least one panel.

A second exemplary aspect of the present invention is a display device including: a first substrate; a second substrate that is opposed to the first substrate; a sealing material for bonding the first substrate and the second substrate together; a display material interposed between the first substrate and the second substrate; and a single parallax barrier layer formed on a surface of the first substrate on an opposite side to the second substrate so as to separate a display image. The first substrate is a thickness smaller than that of the second substrate.

According to exemplary aspects of the present invention, it is possible to provide a display device capable of improving the productivity, and a method of manufacturing the same.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
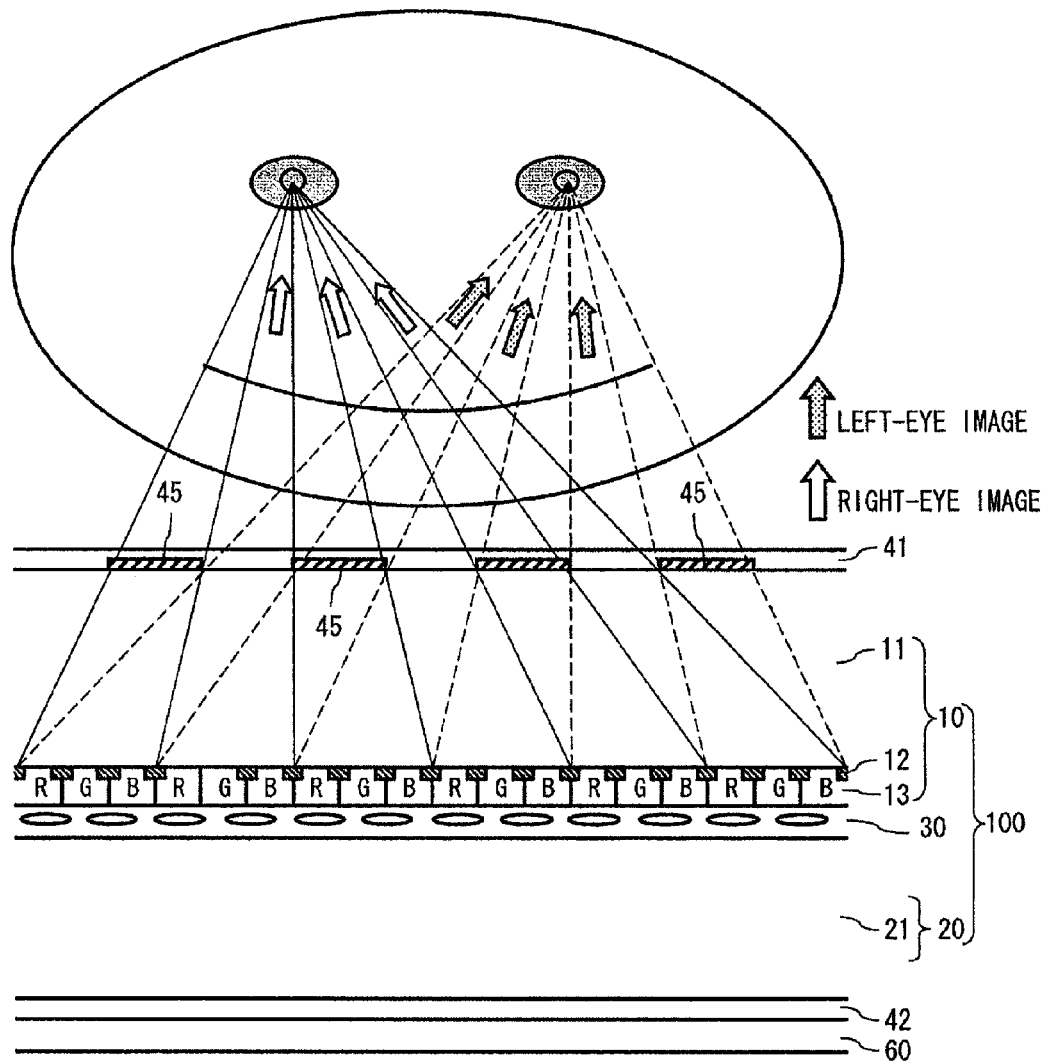
FIG. 1 is a sectional view showing a structure of a liquid crystal display device as an example of a display device according to a first exemplary embodiment of the present invention.

Hereinafter, exemplary embodiments of the present invention will be described in detail with reference to the accompanying drawings. The following description and the drawings are appropriately omitted or simplified to clarify the explanation. The same components are denoted by the same reference numerals throughout the drawings, and a repeated description thereof is omitted as appropriate.

First Exemplary Embodiment

Referring first to FIG. 1, a display device according to a first exemplary embodiment of the present invention will be described. FIG. 1 is a sectional view showing a structure of a liquid crystal display device as an example of the display device according to the first exemplary embodiment. FIG. 1 shows a partial section within a display area. The display device according to the first exemplary embodiment is described by exemplifying an active-matrix type liquid crystal display device, but is illustrated by way of example only. Alternatively, a flat display device (flat panel display) such as an organic EL display device may also be employed.

The display device according to the first exemplary embodiment is a display device capable of displaying different images to different viewpoints, when the images are viewed from at least two viewpoints. The term "viewpoint" herein described refers to a position of each of the right and left eyes of a viewer, for example. If there are a plurality of viewers, the viewpoint indicates the position of each viewer. Therefore, the display device according to the first exemplary embodiment is implemented as a three-dimensional display device capable of displaying an image stereoscopically to a viewer, a dual-screen display device capable of displaying different images to multiple viewers, or the like. Herein, a preferred embodiment in which the present invention is mainly applied to a three-dimensional display device is described.

Referring to FIG. 1, the liquid crystal display device according to the first exemplary embodiment includes a liquid crystal display panel 100. The liquid crystal display panel 100 includes a first substrate such as a color filter (CF) substrate 10, and a second substrate such as a thin film transistor (TFT) substrate 20. The first substrate and the second substrate are opposed to each other. The liquid crystal display device has a structure in which a liquid crystal 30 is encapsulated in a space between the substrates and a sealing material (not shown) for bonding the substrates.

The TFT substrate 20 has a structure in which pixel electrodes (not shown), which form the display area, gate lines (scanning signal lines), and source lines (image signal lines) are formed on a substrate 21 with an insulating film interposed therebetween. The plurality of gate lines are provided in parallel to each other. Similarly, the plurality of source lines are provided in parallel to each other. The gate lines and the source lines are formed so as to intersect each other. For instance, the gate lines and the source lines intersect each other. An area surrounded by adjacent gate lines and adjacent source lines is a pixel. Thus, the pixels are arranged in a matrix in the display area. Each pixel electrode is formed over substantially the entire area of each pixel.

Each TFT (not shown) serving as a switching device is formed near each of intersections of the gate lines and the source lines. The TFTs are arranged in an array in the display area. The TFTs each include a drain electrode and a source electrode (each of which is not shown) which are formed in the same layer as the source lines. The source electrode and the drain electrode are connected via a semiconductor layer. The source lines and the pixel electrodes are connected to each other via the TFTs. Accordingly, when the TFTs are turned on by a scanning signal, a display signal is supplied to the pixel electrodes from the source lines.

An alignment layer (not shown) for aligning the liquid crystal 30 is formed on the pixel electrodes. On the TFT substrate 20, a terminal and the like (not shown) for externally receiving a signal to be supplied to the TFTs are provided.

Meanwhile, the CF substrate 10 has a black matrix (BM) 12 formed on a surface opposed to the TFT substrate 20. The BM 12 is formed of a black resin or a metal such as chromium oxide, and shields light. The BM12 is preferably formed of a metallic material, because the use of a metallic material enables thinning, in comparison with the use of a black resin. A color filter layer 13 made of a pigment or a dye is formed so as to bury openings formed in the BM12. The color filter layer 13 is a colored layer of R (red), G (green), and B (blue), for example. Further, an opposing electrode (not shown) is formed on substantially the entire area of the CF substrate 10 so as to cover the BM12 and the color filter layer 13. An electric field is generated between the opposing electrode and the pixel electrodes of the TFT substrate 20, thereby driving the liquid crystal 30. On the surface in contact with the liquid crystal 30 of the CF substrate 10, an alignment layer (not shown) for aligning the liquid crystal 30 is stacked.

The TFT substrate 20 and the CF substrate 10 are bonded together with a sealing material interposed therebetween. The sealing material is formed in a frame-like shape so as to surround the display area. A liquid crystal layer is sandwiched between the TFT substrate 20 and the CF substrate 10. More specifically, the liquid crystal 30 is introduced into the space between the TFT substrate 20 and the CF substrate 10.

A polarizing plate 42 is bonded to the outer surface of the substrate 21 of the TFT substrate 20. On the outer surface of a substrate 11 of the CF substrate 10, a parallax barrier layer 45 for separating an image is formed. The parallax barrier layer 45 is formed of a light-shielding film which is made of a black resin or a metal such as chromium oxide. The parallax barrier layer 45 is preferably formed of a light-shielding film made of a metal, because the use of the light-shielding film made of a metal enables thinning, in comparison with the use of a black resin. The parallax barrier layer 45 is aligned in a predetermined pattern so that light transmitted through predetermined pixels can reach the right or left eye of the viewer, depending on the pixel array. This array is determined depending on the size, viewing distance (design value), or the like of the liquid crystal display panel. Further, a polarizing plate 41 is bonded to the outer surface of the substrate 11 on the parallax barrier layer 45.

On an opposite side to the visible-side of the liquid crystal display panel 100, a backlight unit 60 and the like are arranged.

In the liquid crystal display device structured as described above, the liquid crystal 30 is driven by the electric field generated between the pixel electrodes and the opposing electrode. That is, the alignment direction of the liquid crystal 30 between the substrates changes. Accordingly, the polarization state of light transmitted through the liquid crystal layer changes. That is, the polarization state of the light that has turned into linearly-polarized light through the polarizing plate is changed by the liquid crystal layer. Specifically, light from the backlight unit 60 is turned into linearly-polarized light by the polarization plate 42 on the TFT substrate 20. When the linearly-polarized light is transmitted through the liquid crystal layer, the polarization state is changed.

An amount of light transmitted through the polarizing plate 41 on the CF substrate 10 is changed in accordance with the polarization state. That is, an amount of light transmitted through the polarizing plate 41 on the visible-side out of the transmitted light that is emitted from the backlight unit 60 and transmitted through the liquid crystal display panel 100 is changed. The alignment direction of the liquid crystal 30 is changed in accordance with an applied display voltage. For this reason, the amount of light transmitted through the polarizing plate 41 on the visible-side can be changed by controlling the display voltage. That is, different display voltages are applied to the pixels to thereby display a desired image.

In this case, two images are displayed alternately for each pixel row through the parallax barrier layer 45 which is disposed every two pixels, thereby making it possible to provide two different displays separately in predetermined directions. This exemplary embodiment exemplifies the case where three colors of R, G, and B form one pixel unit and the parallax barrier layer 45 is disposed every about two pixels. Alternatively, the parallax barrier layer 45 may be disposed every about two dots corresponding to each dot of R, G, and B.

As an operation mode of the liquid crystal display device, a TN (Twisted Nematic) mode, an STN (Super Twisted Nematic) mode, a ferroelectric liquid crystal mode, or the like may be used. It is also possible to employ a liquid crystal display device of a horizontal electric field type, such as an IPS (In-Plane Switching) mode or an FFS (Fringe Field Switching) mode, in which the opposing electrode is disposed on the TFT substrate 20 and an electric field is horizontally applied to the liquid crystal 30 between the opposing electrode and the pixel electrode. In the case of the liquid crystal panel adopting the horizontal electric field mode, some changes should be made as necessary in the structure of the first exemplary embodiment except for the principal part of the present invention. For instance, an overcoat film is formed in place of the opposing electrode on the color filter layer 13 and the BM12 of the CF substrate 10. Not only a transmissive liquid crystal display device, but also a reflective liquid crystal display device and a transflective liquid crystal display device which has both functions of the transmissive type and the reflective type may be applied.

While the first exemplary embodiment exemplifies the case where the parallax barrier layer 45 is disposed between the CF substrate 10 and the polarizing plate 41, the parallax barrier layer 45 may be disposed between the TFT substrate 20 and the polarizing plate 42. While the CF substrate 10 is disposed on the visible-side and the TFT substrate 20 is disposed on the backlight side, the positions of these substrates may be reversed. That is, it is only necessary to dispose the parallax barrier layer 45 on the outer surface of one of the first substrate and the second substrate that are opposed to each other.

Figure 2:
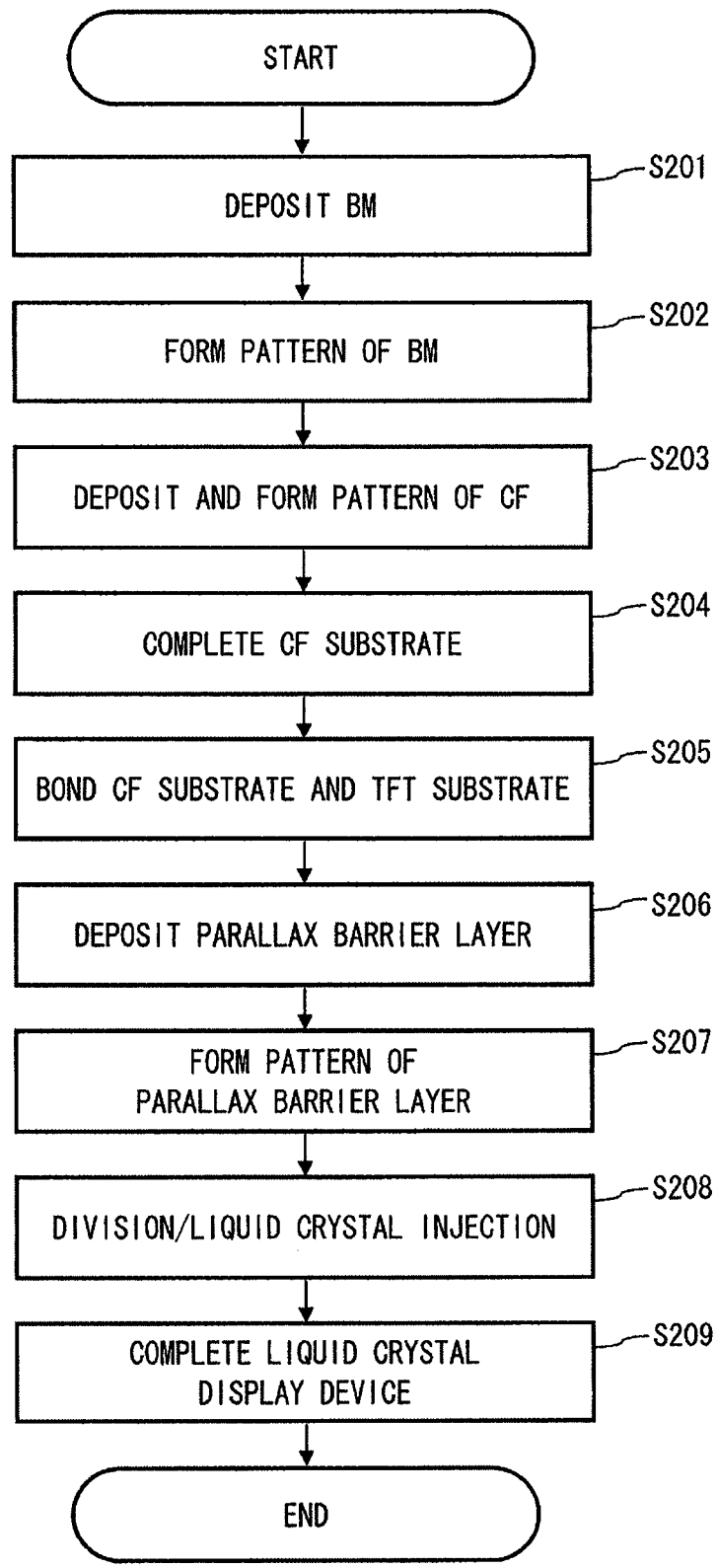
FIG. 2 is a flowchart showing a flow of manufacturing steps for the liquid crystal display device according to the first exemplary embodiment.
Figure 3A:
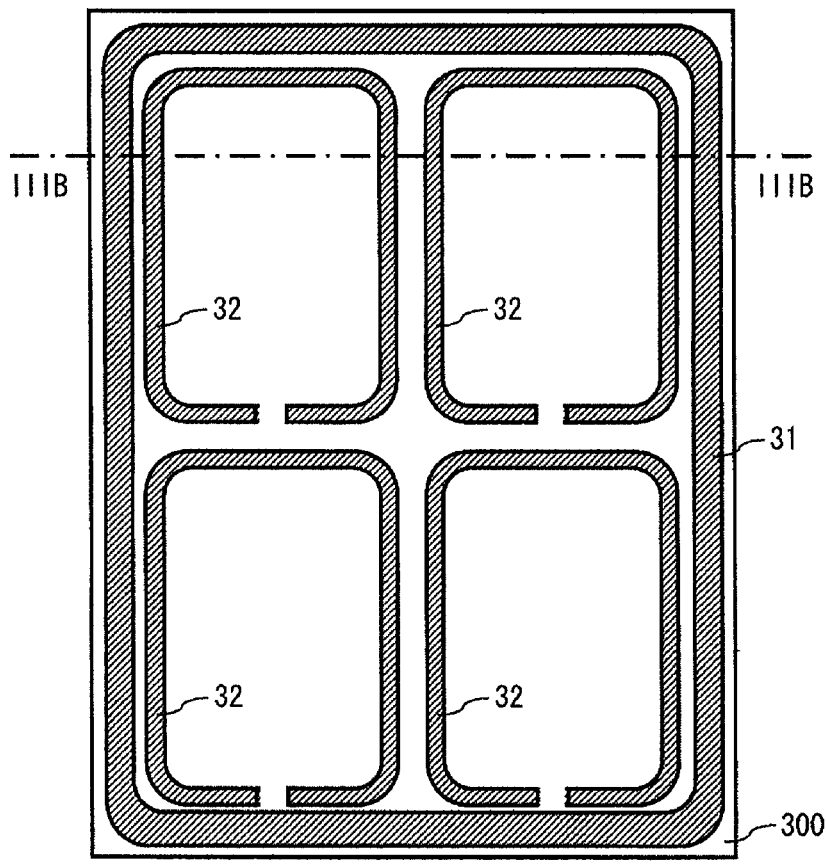
FIGS. 3A and 3B are diagrams each showing a manufacturing steps for the liquid crystal display device according to the first exemplary embodiment.
Figure 3B:
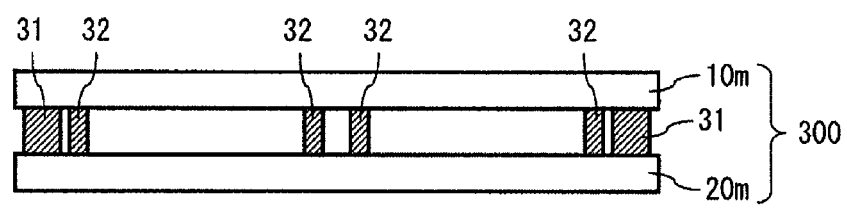
Figure 4:
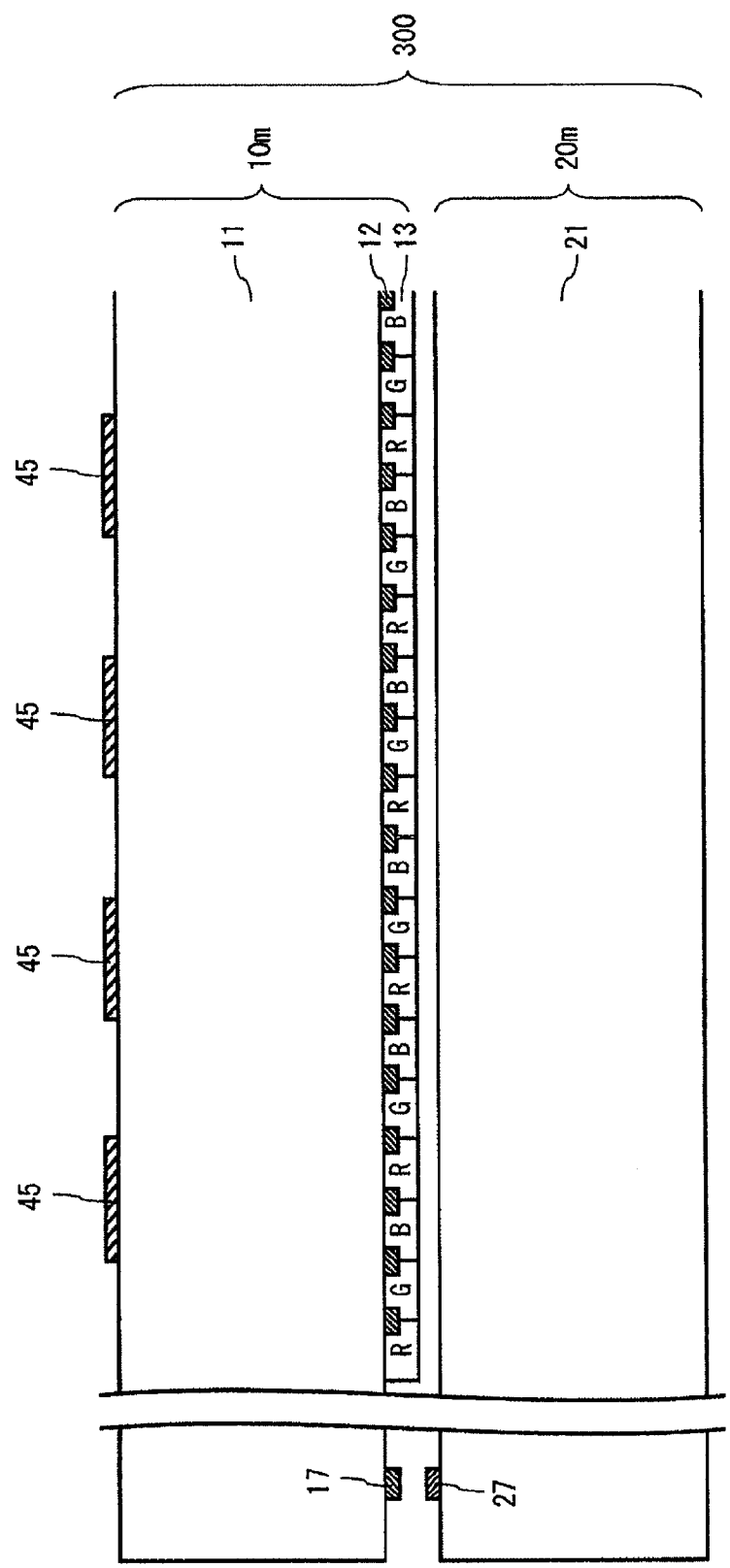
FIG. 4 is a diagram showing a manufacturing step for the liquid crystal display device according to the first exemplary embodiment.

Next, a method of manufacturing the liquid crystal display device according to the first exemplary embodiment will be described with reference to FIG. 2. FIG. 2 is a flowchart showing a flow of manufacturing steps for the liquid crystal display device according to the first exemplary embodiment. The following description is made by referring to FIGS. 3A, 3B, and 4 as needed. FIGS. 3A, 3B, and 4 are diagrams each showing a manufacturing step for the liquid crystal displayed device according to the first exemplary embodiment.

First, a light-shielding film for forming the BM12 is deposited on one surface of the substrate 11 (step S201). A resin including a pigment or a metal such as chrome may be used for the light-shielding film. The method of depositing the light-shielding film is not particularly limited, and a well-known method may be appropriately selected depending on the material to be used. Then, the deposited light-shielding film is patterned to form a pattern of the BM12 (step S202). As the method of patterning the light-shielding film, a well-known method may be appropriately selected depending on the deposited material. In step S202, it is preferable to simultaneously form an alignment mark for use in alignment in the subsequent steps.

Next, deposition and pattern formation of each layer constituting the CF substrate 10 are carried out (step S203). Specifically, the color filter layer 13 is formed on the BM12 by a photolithography process. A photosensitive resin including a pigment or a dye may be used for the color filter layer 13. Then, the opposing electrode is formed on substantially the entire area of the substrate 11 so as to cover the BM12 and the color filter layer 13. A transparent conductive film formed of ITO or the like is used as the opposing electrode. In this manner, the CF substrate 10 having a mother substrate shape (hereinafter referred to as "first mother substrate 10m") is formed by the manufacturing method similar to a typical manufacturing method, and the first mother substrate 10m" is completed (step S204).

An alignment layer is formed on the first mother substrate 10m which is produced as described above. Similarly, an alignment layer is also formed on the TFT substrate 20 having a mother substrate shape (hereinafter referred to as "second mother substrate 20m") which is produced by repeatedly performing deposition, patterning by the photolithography process, and pattern formation by etching or the like on one surface of another substrate 21. Then, an alignment process (rubbing process) is performed on the alignment layer so as to make micro scratches in one direction on a contact surface with the liquid crystal.

Next, a sealing material is applied to one of the second mother substrate 20m and the first mother substrate 10m. After that, the electrodes of the TFT substrate 20 and the CF substrate 10 are bonded together so as to face each other. Then, the sealing material is cured in the state where the both substrates are bonded together. In this manner, the first mother substrate 10m and the second mother substrate 20m are bonded together by a panel process similar to a typical panel process (step S205). As a result, as shown in FIG. 3B, a cell substrate 300 is formed in which the first mother substrate 10m and the second mother substrate 20m are bonded together. That is, the cell substrate 300 from which a plurality of panels are to be cut out is formed.

FIG. 3A is a plan view showing a process after formation of the cell substrate 300, and FIG. 3B is a sectional view taken along the line IIIB-IIIB of FIG. 3A. As shown in FIG. 3B, the cell substrate 300 has a structure in which the first mother substrate 10m and the second mother substrate 20m are bonded together with a sealing material. In the first exemplary embodiment, the sealing material includes a substrate sealing portion 31 formed on a peripheral portion of the cell substrate 300, and panel sealing portions 32 formed for each panel inside the substrate sealing portion 31. The panel sealing portions 32 are formed in a frame shape so as to surround the display area of each panel except for a portion serving as a liquid crystal inlet.

The substrate sealing portion 31 is provided so as to prevent the inside of the panels from being contaminated or corroded during a process such as polishing or etching performed on the cell substrate 300. Specifically, the substrate sealing portion 31 is disposed outside the panel sealing portions 32 so as to surround the whole panel sealing portions 32. Accordingly, the cell substrate 300 has a closed space surrounded by the first mother substrate 10m, the second mother substrate 20m, and the substrate sealing portion 31. As a result, the panel sealing portions 32 or the panels each having the liquid crystal inlet are disposed inside the closed space, thereby preventing the panels from being contaminated or corroded.

In this manner, in the cell substrate 300, the plurality of panels are simultaneously formed, thereby improving the productivity in the manufacturing process. Note that the number of panels to be formed in the cell substrate 300 may be one.

After formation of the cell substrate 300, a light-shielding film for forming the parallax barrier layer 45 is deposited on the outer surface of the cell substrate 300 (step S206). In this case, the light-shielding film for forming the parallax barrier layer 45 is deposited on the surface of the first mother substrate 10m, i.e., on the surface opposite to the surface on which the BM12 of the substrate 11 is formed. As the material of the light-shielding film, a black resin or a metal such as chromium oxide may be used. A metal is preferably used for the following advantages. That is, a metal can be made thinner than a black resin and is resistant to damage in a series of steps of forming a liquid crystal display panel. In addition, a high light-shielding effect can be obtained with a relatively thin metal film. The method of depositing the light-shielding film is not particularly limited, and a well-known method may be appropriately selected depending on the material to be used.

Then, the deposited light-shielding film is patterned by the photolithography process to form a pattern of the parallax barrier layer 45 (step S207). Specifically, when the parallax barrier layer 45 is formed of a metal, for example, a resist pattern is formed by the photolithography process on the deposited light-shielding film, and the light-shielding film is etched using this resist pattern as a mask. As a result, the light-shielding film is patterned and the parallax barrier layer 45 is formed as shown in FIG. 4.

In the series of steps S207 and S208 involving the formation of the parallax barrier layer 45, the substrate sealing portion 31 is formed along the periphery of the cell substrate 300 as described above. This prevents a processing liquid, such as a developer or an etchant, from entering the panels. Accordingly, the BM12 is not etched during the etching process for forming the parallax barrier layer 45, thereby enabling formation of these layers using the same metal film. Additionally, there is no need to form a resist for protecting the BM12. Moreover, it is possible to prevent the inside of the panels from being contaminated or corroded by the etchant.

At the time of forming the pattern of the parallax barrier layer 45 in step S207, alignment of the pattern of the parallax barrier layer 45 is carried out using an alignment mark 17 (see FIG. 4) which is provided on a surface of the first mother substrate 10m at the inside of the cell substrate 300. Specifically, a resist pattern is formed by the photolithography process in which a photosensitive resin is applied onto the light-shielding film deposited in step S5206 and exposure and development are carried out on the applied photosensitive resin. In this case, alignment of a photomask is carried out using the alignment mark 17, and the photosensitive resin is exposed to light.

Thus, at the time of depositing the light-shielding film serving as the parallax barrier layer 45 in step S206, mask sputtering or the like is carried out to prevent the light-shielding film from being deposited on the periphery of the alignment mark 17. Alternatively, after deposition of the light-shielding film serving as the parallax barrier layer 45 on the entire surface of the substrate 11, a process for etching only the peripheral portion of the alignment mark 17 may be carried out. It is preferable to simultaneously form the alignment mark 17 during the process for forming the BM12 by using the material for forming the BM12.

In the first exemplary embodiment, the parallax barrier layer 45 is formed in the state of the cell substrate 300. This makes it possible to simultaneously form the parallax barrier layer 45 on the plurality of panels which are cut out from the cell substrate 300. That is, the alignment mark 17 is provided in advance on the mother substrate, and the steps of forming the parallax barrier layer 45 are collectively performed on the plurality of panels by using the alignment mark 17. This contributes to improvement of the productivity.

When the first mother substrate 10m (CF substrate 10) and the second mother substrate (TFT substrate 20) are bonded together in step S205, the first mother substrate 10m is aligned using an alignment mark 27 (see FIG. 4) which is provided on a surface of the second mother substrate 20m on the inside of the cell substrate 300. It is preferable to simultaneously form the alignment mark 27 during the process for forming any of the layers constituting the second mother substrate 20m. For instance, the alignment mark 27 may be formed during a process for forming the gate lines.

After formation of the parallax barrier layer 45 as described above, the cell substrate 300 is cut and divided into a plurality of panels, and the liquid crystal 30 is injected into the divided individual panels (step S208). Alternatively, the cell substrate 300 may be divided into stick-like pieces before the liquid crystal is injected into the plurality of panels. The liquid crystal is injected from the liquid crystal inlet by a vacuum injection method, for example. Before the cell substrate 300 is divided into panels, it is preferable to cut off the substrate sealing portion 31 from the panels. After injection of the liquid crystal 30, the liquid crystal inlet is sealed. For instance, a photocurable resin is applied to the liquid crystal inlet, and light is irradiated thereto to cure the photocurable resin, thereby sealing the liquid crystal inlet.

While the first exemplary embodiment exemplifies the injection using the liquid crystal injection method through the liquid crystal inlet, a one drop filling method may also be employed. In the one drop filling method, the panel sealing portions 32 having a frame-like shape with no inlet are formed. Then, the liquid crystal 30 is dropped onto one of the TFT substrate 20 and the CF substrate 10 having a sealing material formed thereon. After dropping the liquid crystal 30, the TFT substrate 20 and the CF substrate 10 are bonded together and the sealing material is cured. After that, the parallax barrier layer 45 may be formed on the cell substrate 300 in which the liquid crystal 30 is encapsulated within the panels, and the cell substrate 300 may be divided into panel pieces.

Next, the polarizing plates 41 and 42 are bonded on both outer surfaces of each of the divided liquid crystal display panels 100. Then, the backlight unit 60 and the like are mounted thereon, thereby completing the liquid crystal display device (step S209).

As the manufacturing process for the liquid crystal display device described above, a typical manufacturing process may be employed. Any change or modification may be added to the well-known method, and it is only necessary to add the step of forming the parallax barrier layer 45 after formation of the cell substrate 300. Thus, the first exemplary embodiment has a feature that the step of forming the parallax barrier layer 45 is added after formation of the cell substrate 300 in a typical manufacturing process for a liquid crystal display device.

Figure 5:
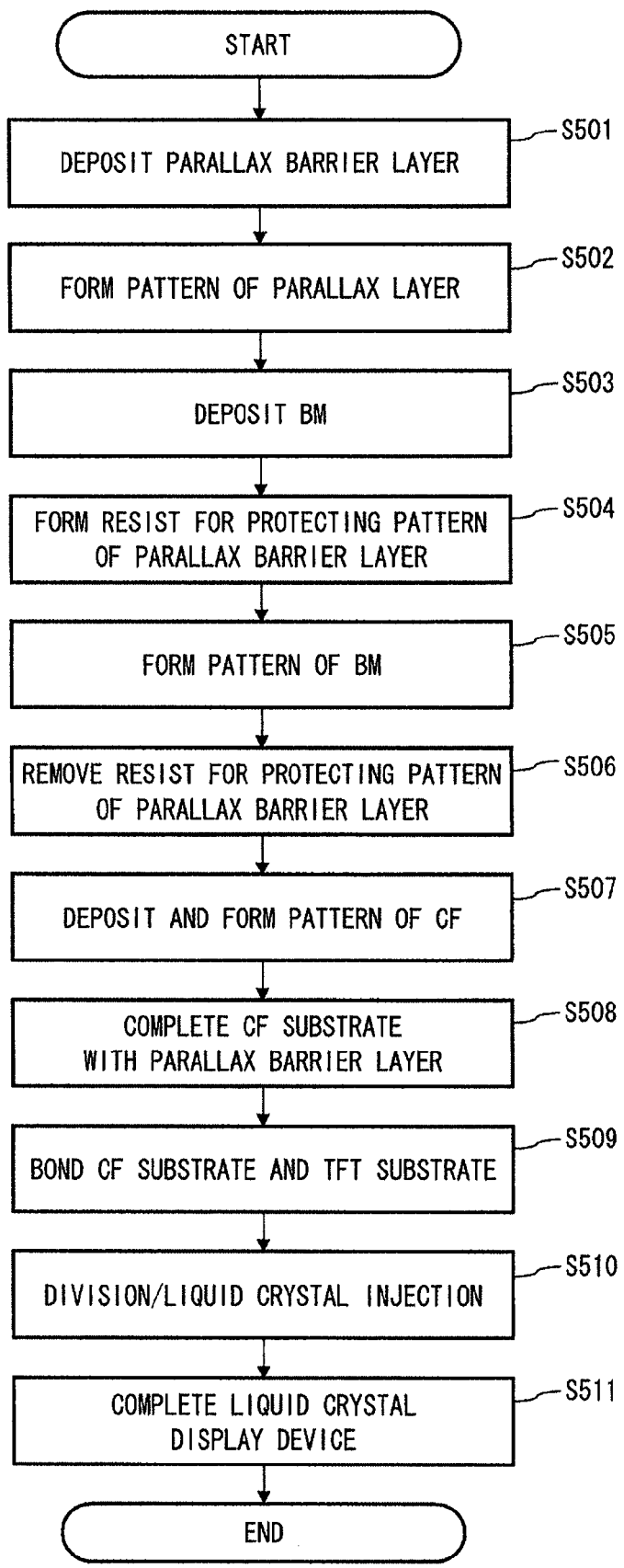
FIG. 5 is a flowchart showing a flow of manufacturing steps for a liquid crystal display device according to Comparative Example 1.

Referring now to FIG. 5, for the purpose of comparison, a description is given of a flow of manufacturing steps for a 3D-LCD when the parallax barrier layer 45 is formed before the first mother substrate 10m and the second mother substrate 20m are bonded together, instead of forming the parallax barrier layer 45 after bonding the first mother substrate 10m and the second mother substrate 20m as in the first exemplary embodiment. FIG. 5 is a flowchart showing a flow of manufacturing steps for a liquid crystal display device according to Comparative Example 1.

In Comparative Example 1, a light-shielding film serving as the parallax barrier layer 45 is first deposited on the surface of the substrate 11 of the first mother substrate 10m (step S501), and the deposited light-shielding film is patterned to form a pattern of the parallax barrier layer 45 (step S502). Next, a light-shielding film serving as the BM12 is deposited on the surface of the substrate 11 opposite to the surface where the parallax barrier layer 45 is formed (step S503).

Before patterning of the deposited light-shielding film is performed, the following process is performed. That is, in order to prevent the parallax barrier layer 45 formed on the back surface from being etched during an etching process for the patterning, a resist for protecting the pattern of the parallax barrier layer 45 is formed (step S504). In the state where the parallax barrier layer 45 is protected by the resist for protecting the pattern, the light-shielding film deposited in step S503 is patterned to form a pattern of the BM12 (step S505). After the pattern formation of the BM12 is completed, the resist for protecting the pattern on the parallax barrier layer 45 is stripped and removed (step S506).

After that, in a similar manner as in a general process for forming the CF substrate 10, deposition and pattern formation of each layer constituting the CF substrate 10 are carried out on the BM12 (step S507). Through the above-mentioned steps, the CF substrate 10 with the parallax barrier layer 45 is completed (step S508). Then, as in a general process for manufacturing a liquid crystal display device, the substrates are bonded together (step S509), and after a panel division/liquid crystal injection step (step S510) is finished, the liquid crystal display device is completed (step S511).

Thus, in Comparative Example 1, when the parallax barrier layer 45 and the BM 12 of the CF substrate 10 are formed using the same type of metal, it is necessary to separately carry out processes for forming a resist for protecting the pattern and removing the resist so as to protect the parallax barrier pattern. This results in an increase in the number of steps. Meanwhile, in the first exemplary embodiment, even when the parallax barrier layer 45 and the BM12 of the CF substrate 10 are formed using the same type of metal, there is no need to carry out processes for forming the resist for protecting the pattern and removing the resist so as to protect the parallax barrier layer 45. Consequently, the number of overall processes for manufacturing the three-dimensional liquid crystal display device including the CF substrate forming process can be reduced.

As described above, in the first exemplary embodiment, the cell substrate 300, from which at least one panel is cut out, is formed by bonding the first mother substrate 10*m* and the second mother substrate 20*m*, and the parallax barrier layer 45 is then formed on the cell substrate 300. This eliminates the need to form the resist for protecting the pattern to protect the parallax barrier layer 45 when the parallax barrier layer 45 and the BM12 are formed using the same type of metal. This results in a reduction in the number of manufacturing steps. Besides, there is no need to form the BM 12 using a black resin to prevent an increase in the number of steps. Instead, a metal having a high light-shielding effect, such as chromium, can be applied to the BM12. Moreover, fine patterning can be facilitated. Consequently, the productivity can be improved.

Further, the first exemplary embodiment employs the method in which the parallax barrier layer 45 is simultaneously formed on the plurality of panels, and thereafter the panels are divided. Thus, the number of steps can be reduced as compared to the method in which the parallax barrier layer, the adhesion layer, the glass substrate, and the like are stacked on the display device as disclosed in Japanese Unexamined Patent Application Publication No. 2008-8934.

Furthermore, in the first exemplary embodiment, the CF substrate 10 and the TFT substrate 20 are bonded together with the sealing material including the panel sealing portions 32 formed for each panel and the substrate sealing portion 31 surrounding the panel sealing portions 32. This prevents an etchant or the like from entering the panels, and also prevents the etchant or the like from affecting the pattern and the like formed on each of the CF substrate 10 and the TFT substrate 20.

Moreover, in the steps up to the formation of the parallax barrier layer 45, the same second mother substrate 20*m* and first mother substrate 10*m* as those of a general two-dimensional liquid crystal display device can be used. That is, the second mother substrate 20*m* and the first substrate 10*m* can be shared with general liquid crystal display devices. Also the cell substrate 300 obtained before formation of the parallax barrier layer 45 can be shared with general liquid crystal display devices. Accordingly, the components can be standardized (normalized) and can be distributed, as needed, to a general two-dimensional liquid crystal display device and a liquid crystal display device for displaying different images depending on viewing angles (in particular, a three-dimensional liquid crystal display device).

Second exemplary embodiment

Figure 6:
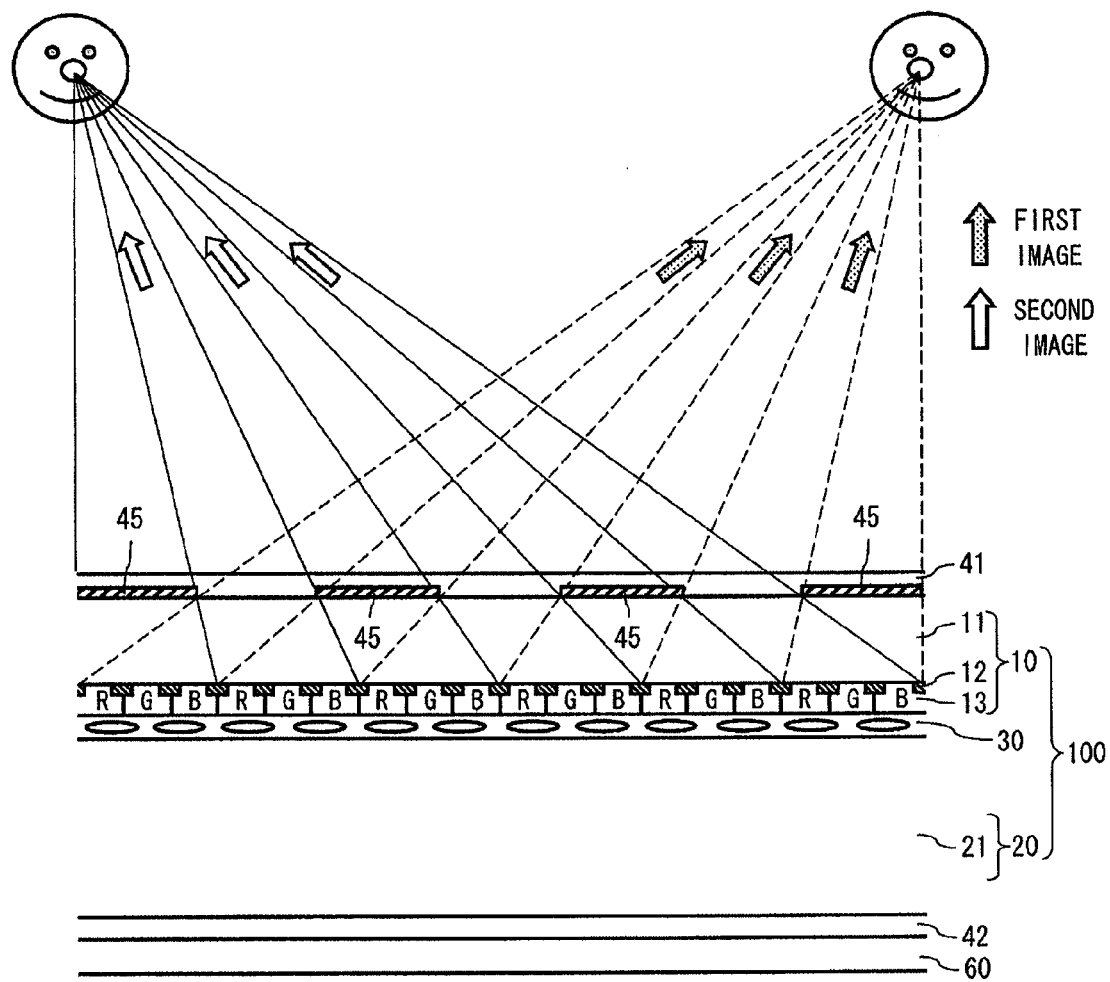
FIG. 6 is a sectional view showing a structure of a liquid crystal display device as an example of a display device according to a second exemplary embodiment of the present invention.

A display device according to a second exemplary embodiment of the present invention will be described with reference to FIG. 6. FIG. 6 is a sectional view showing a structure of a liquid crystal display device as an example of the display device according to the second exemplary embodiment. FIG. 6 shows a partial section within a display area. The second exemplary embodiment exemplifies a preferred embodiment in which the present invention is mainly applied to a dual-screen display device. Components similar to those of the liquid crystal display device of the first exemplary embodiment shown in FIG. 1 are denoted by the same reference numerals, and only differences will be described below.

Referring to FIG. 6, the thickness of the substrate on which the parallax barrier layer 45 is formed, i.e., the thickness of the substrate 11 of the CF substrate 10 according to the second exemplary embodiment is different from that of the first exemplary embodiment. The thickness thereof is smaller than that of the first exemplary embodiment. The substrate 11 of the CF substrate 10 is a thickness smaller than that of the substrate 21 of the TFT substrate 20.

The thickness of the substrate 11 is determined so that a distance between the parallax barrier layer 45 and the color filter layer 13 is set to an optimum value for separating a display image. The optimum distance between the parallax barrier layer 45 and the color filter layer 13 for separating the display image varies depending on a pitch of LCD pixels and an angle of luminance peaks of a left side image and a right side image. In the case of the dual-screen LCD, the distance is equal to or smaller than about 0.5 mm, e.g., about 0.1 mm or 0.3 mm. Accordingly, the thickness of the substrate 11, which isolates the parallax barrier layer 45 from the color filter layer 13, is also equal to or smaller than about 0.5 mm, e.g., about 0.1 mm or 0.3 mm.

In other words, the substrate 11 is thinned by a process, such as polishing, to be thinner than the thickness of the substrate 21 of the TFT substrate 20 so that the distance between the parallax barrier layer 45 and the color filter layer 13 is set to an optimum value for separating the display image.

The parallax barrier layer 45 is aligned in a predetermined pattern so that light transmitted through predetermined pixels can reach a viewer located on the right side or a viewer located on the left side, depending on the pixel array. This array is determined depending on viewing distance (design value), the size of the liquid crystal display panel or the like. While FIG. 6 illustrates the case where three colors of R, G, and B form one pixel unit and the parallax barrier layer 45 is disposed every about two pixels, the parallax barrier layer 45 may be disposed every about two dots corresponding to each dot of R, G, and B.

Figure 7:
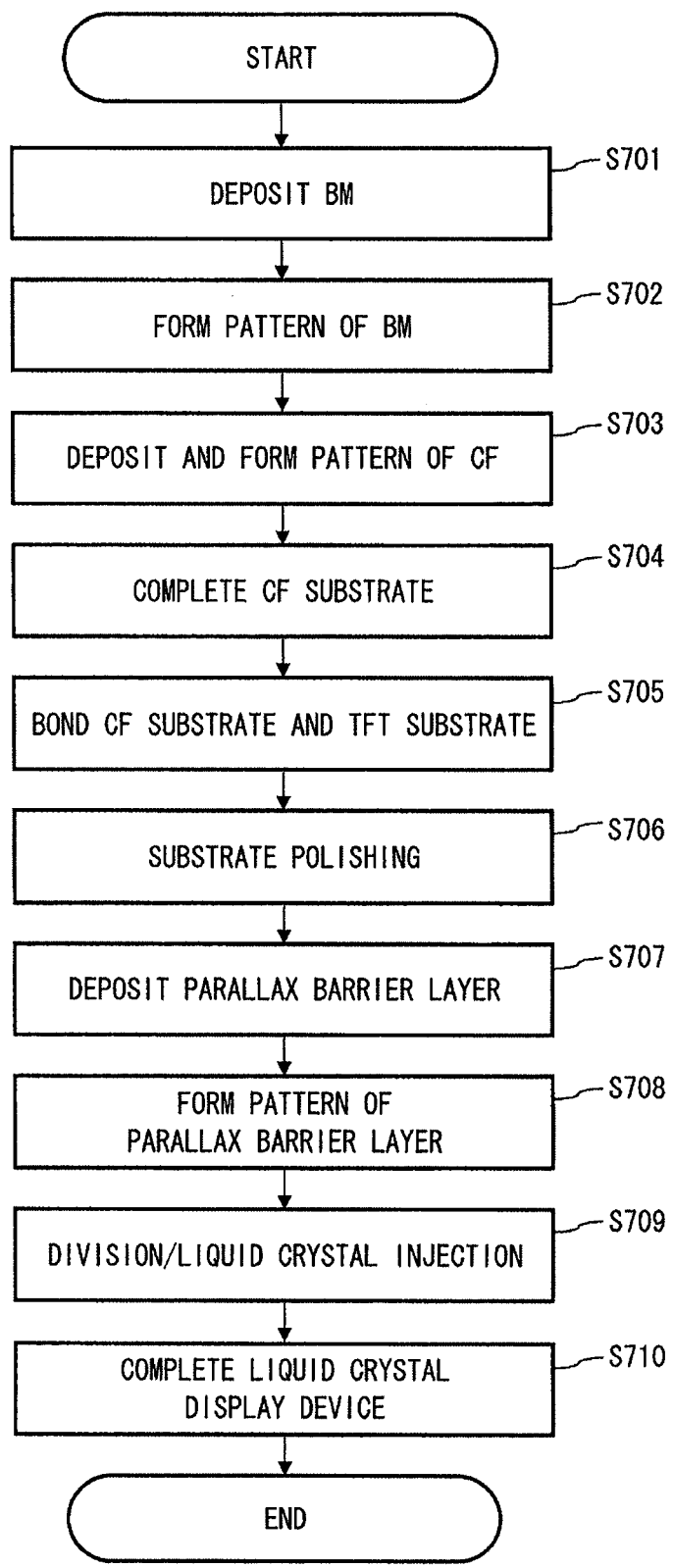
FIG. 7 is a flowchart showing a flow of manufacturing steps for the liquid crystal display device according to the second exemplary embodiment.
Figure 8:
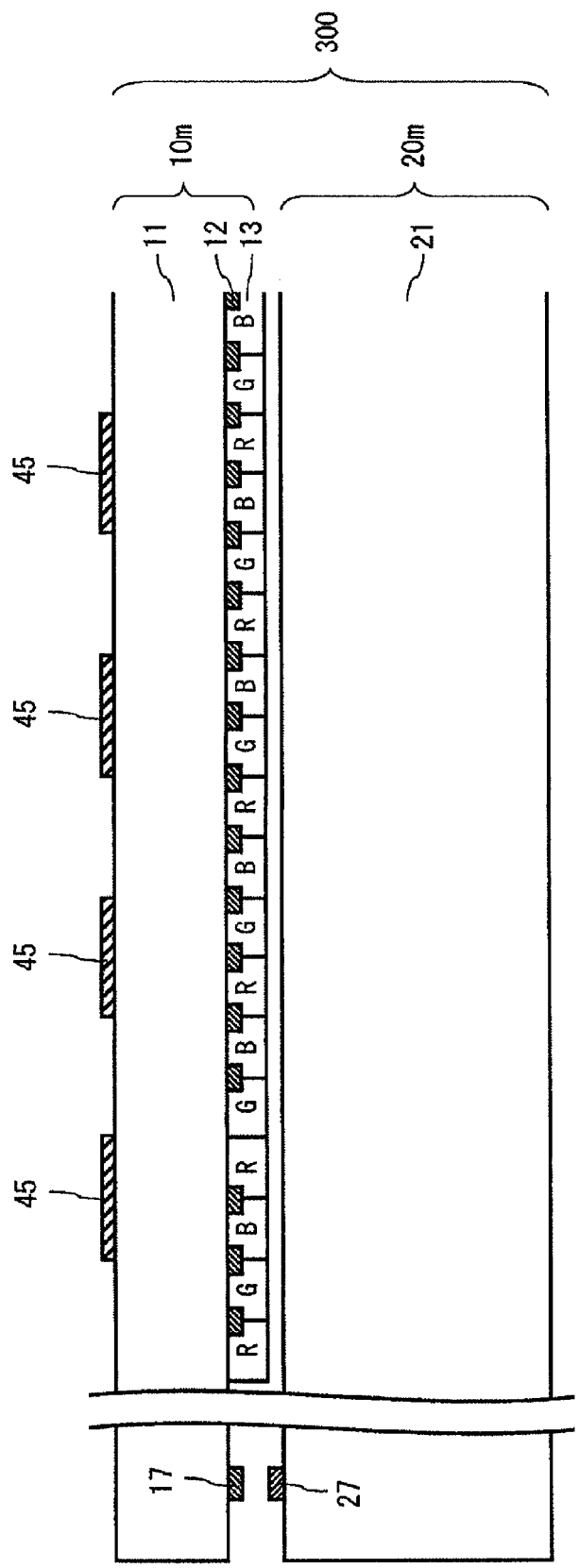
FIG. 8 is a diagram showing a manufacturing step for the liquid crystal display device according to the second exemplary embodiment.

Next, a method of manufacturing the liquid crystal display device according to the second exemplary embodiment will be described with reference to FIG. 7. FIG. 7 is a flowchart showing a flow of manufacturing steps for the liquid crystal display device according to the second exemplary embodiment. The following description is made by referring to FIG. 8 as needed. FIG. 8 is a diagram showing a manufacturing step for the liquid crystal display device according to the second exemplary embodiment.

In the second exemplary embodiment, the steps up to the formation of the cell substrate 300 are similar to those of the first exemplary embodiment. Accordingly, in a similar manner as in the first exemplary embodiment, a light-shielding film for forming the BM12 is first deposited on one surface of the substrate 11 (step S701), and the deposited light-shielding film is patterned to form a pattern of the BM 12 (step S702). After that, deposition and pattern formation of each layer constituting the CF substrate 10 are carried out (step S703), thereby completing the first mother substrate 10*m* (CF substrate 10) (step S704). The first substrate 10*m* which is produced as described above, and the second substrate 20*m* (TFT substrate 20) which is produced separately are bonded together (step S705), thereby forming the cell substrate 300.

After formation of the cell substrate 300, in the second exemplary embodiment, the substrate is thinned by polishing or the like (step S706). Thus, the substrate 11 located on the side where the parallax barrier layer 45 is formed in the subsequent process has a desired thickness. The method of thinning the substrate is not limited to polishing, but any method such as etching may also be employed. In step S706 involving the thinning of the substrate, the substrate sealing portion 31 formed along the periphery of the cell substrate 300 prevents a processing liquid such as a polishing solution or an etchant from entering the panels. This makes it possible to prevent the inside of the panels from being contaminated or corroded by the processing liquid.

Then, on the outer surface of the substrate 11 thus thinned, a light-shielding film for forming the parallax barrier layer 45 is deposited (step S707), and the deposited light-shielding film is patterned to form a pattern of the parallax barrier layer 45 (step S708). As a result, as shown in FIG. 8, the parallax barrier layer 45 is formed on the side opposite to the surface on which the BM12 of the substrate 11 is formed. During pattern formation of the parallax barrier layer 45 in step S708, alignment of the pattern of the parallax barrier layer 45 is carried out using the alignment mark 17 (see FIG. 8), which is provided in the first mother substrate 10m, in a similar manner as in the first exemplary embodiment.

In this manner, in the second exemplary embodiment, thinning of the substrate and formation of the parallax barrier layer 45 are carried out in the state of the cell substrate 300. This makes it possible to collectively perform these processes on the plurality of panels to be cut out from the cell substrate 300. That is, the plurality of panels cut out from the cell substrate 300 are subjected to the thinning process at once, and the parallax barrier layer 45 is formed on the plurality of panels simultaneously. This leads to improvement of the productivity.

The subsequent steps are similar to those of the first exemplary embodiment. Specifically, after a panel division/liquid crystal injection step (step S709), the liquid crystal display device is completed (step S710). Thus, the second exemplary embodiment has a feature that the step of thinning the substrate of the side where the parallax barrier layer 45 is formed is added after formation of the cell substrate 300 and before formation of the parallax barrier layer 45.

Figure 9:
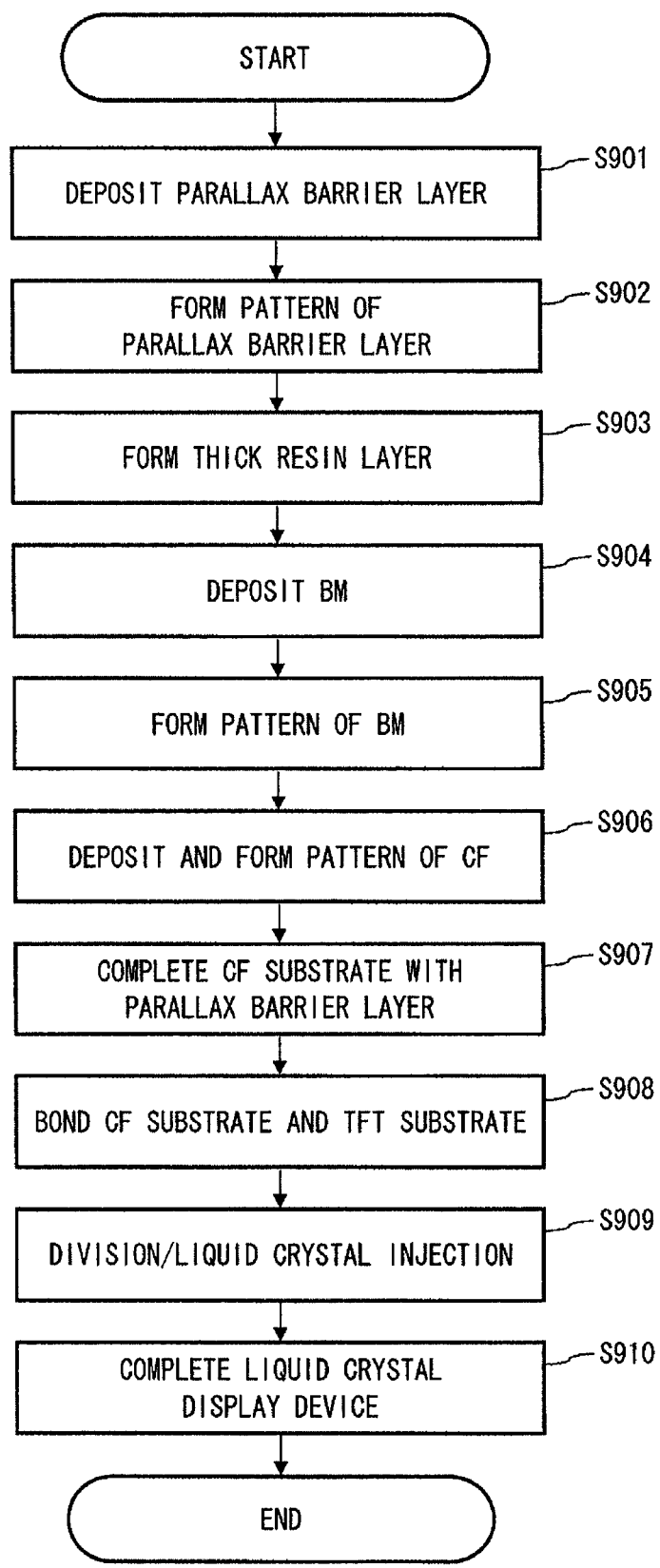
FIG. 9 is a flowchart showing a flow of manufacturing steps for a liquid crystal display device according to Comparative Example 2.
Figure 10:
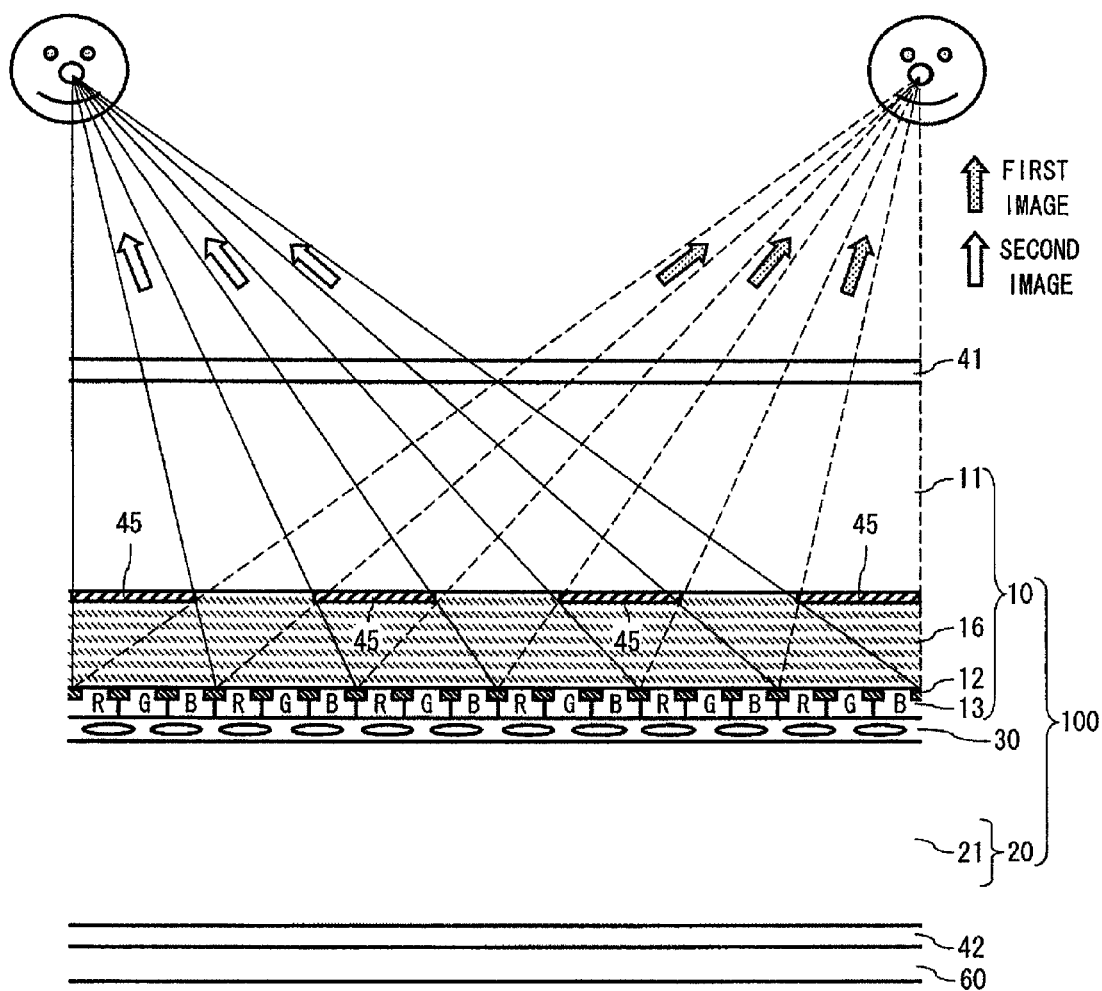
FIG. 10 is a sectional view showing a structure of the liquid crystal display device according to Comparative Example 2.

Referring now to FIG. 9, for the purpose of comparison, a description will be given of a flow of manufacturing steps for a dual-screen LCD when the optimum distance between the parallax barrier layer 45 and the color filter layer 13 for separating the display image is adjusted not by the thickness of the substrate as in the second exemplary embodiment, but by forming a thick resin layer (Comparative Example 2). FIG. 9 is a flowchart showing a flow of manufacturing steps for a liquid crystal display device according to Comparative Example 2. The following description is made by referring to FIG. 10 as needed. FIG. 10 is a sectional view showing the structure of the liquid crystal display device according to Comparative Example 2. FIG. 10 shows a partial section within the display area.

In Comparative Example 2, a light-shielding film serving as the parallax barrier layer 45 is first deposited on the surface of the substrate 11 of the CF substrate 10 (step S901), and the deposited light-shielding film is patterned to form a pattern of the parallax barrier layer 45 (step S902). Next, a thick resin layer 16 is formed on the parallax barrier layer 45 (step S903). Thus, as shown in FIG. 10, the parallax barrier layer 45 is covered with the thick resin layer 16. Then, a light-shielding film serving as the BM12 is deposited on the thick resin layer 16 (step S904), and the deposited light-shielding film is patterned to form a pattern of the BM12 (step S905).

After that, in a similar manner as a general process for forming the CF substrate 10, deposition and pattern formation of each layer constituting the CF substrate 10 are carried out on the BM12 (step S906). Through the above-mentioned steps, the CF substrate 10 with the parallax barrier layer 45 is completed (step S907). Then, in a similar manner as a general process for manufacturing a liquid crystal display device, the substrates are bonded together (step S908), and after a panel division/liquid crystal injection step (step S909) is finished, the liquid crystal display device is completed (step S910).

Thus, in Comparative Example 2, the thick resin layer 16 is formed after formation of the parallax barrier layer 45 and before formation of the BM12. However, a warp may occur in the substrate 11 due to a stress of the thick resin layer 16 thus formed. This may make it difficult to continuously perform the subsequent manufacturing steps. Besides, a crack or a wrinkle may occur in the thick resin layer 16 due to its shrinkage, resulting in deterioration of the display quality. Furthermore, absorbed moisture or the like may evaporate and be released from the thick resin layer 16 during or after the manufacturing process. This results in deterioration of the reliability. Meanwhile, in the second exemplary embodiment, after formation of the cell substrate 300, the substrate of the side where the parallax barrier layer 45 is formed is thinned, and thereafter the parallax barrier layer 45 is formed. This enables adjustment of the optimum distance between the parallax barrier layer 45 and the color filter layer 13 without forming the thick resin layer 16.

As described above, in the second exemplary embodiment, after formation of the cell substrate 300 by bonding the first mother substrate 10m and the second mother substrate 20m, the substrate of the side where the parallax barrier layer 45 is formed is thinned, and thereafter the parallax barrier layer 45 is formed on the thinned substrate. This enables adjustment of the optimum distance between the parallax barrier layer 45 and the color filter layer 13 without forming the thick resin layer 16. That is, the substrate 11 itself functions as the thick resin layer 16. This eliminates the need for forming the thick resin layer 16 in the process for manufacturing a dual-screen display device. Additionally, the steps such as coating and curing of the thick resin layer 16 can be omitted, and there is no need for the material of the thick resin layer 16. Further, a warp or a wrinkle can be prevented from occurring in the substrate 11, and the yield at each stage of components and in a test for the appearance of each product can be improved. Furthermore, malfunction due to release of moisture or the like from the thick resin layer 16 can be prevented from occurring. Moreover, since no light is absorbed by the thick resin layer 16, the transmittance of light of the backlight or the like in the display device increases, resulting in suppression of energy consumption.

After formation of the cell substrate 300, the substrate of the side where the parallax barrier layer 45 is formed is polished to be thinned. This enables adjustment of an optimum distance for viewing an image in a three-dimensional display device, and adjustment of an optimum viewpoint for each of the right side image and the left side image in a dual-screen display device.

In the steps up to the thinning of the substrate, the same TFT substrate 20 and CF substrate 10 as those of a general two-dimensional liquid crystal display device can be used. In other words, the TFT substrate 20 and the CF substrate 10 can be shared with general liquid crystal display devices. The cell substrate 300 obtained before the step of thinning the substrate can also be shared with general liquid crystal display devices. Accordingly, the components can be standardized (normalized) and can be distributed, as needed, to a general two-dimensional liquid crystal display device and liquid crystal display devices for displaying different images depending on viewing angles (a three-dimensional liquid crystal display device and a dual-screen liquid crystal display device).

Third Exemplary Embodiment

Figure 11:
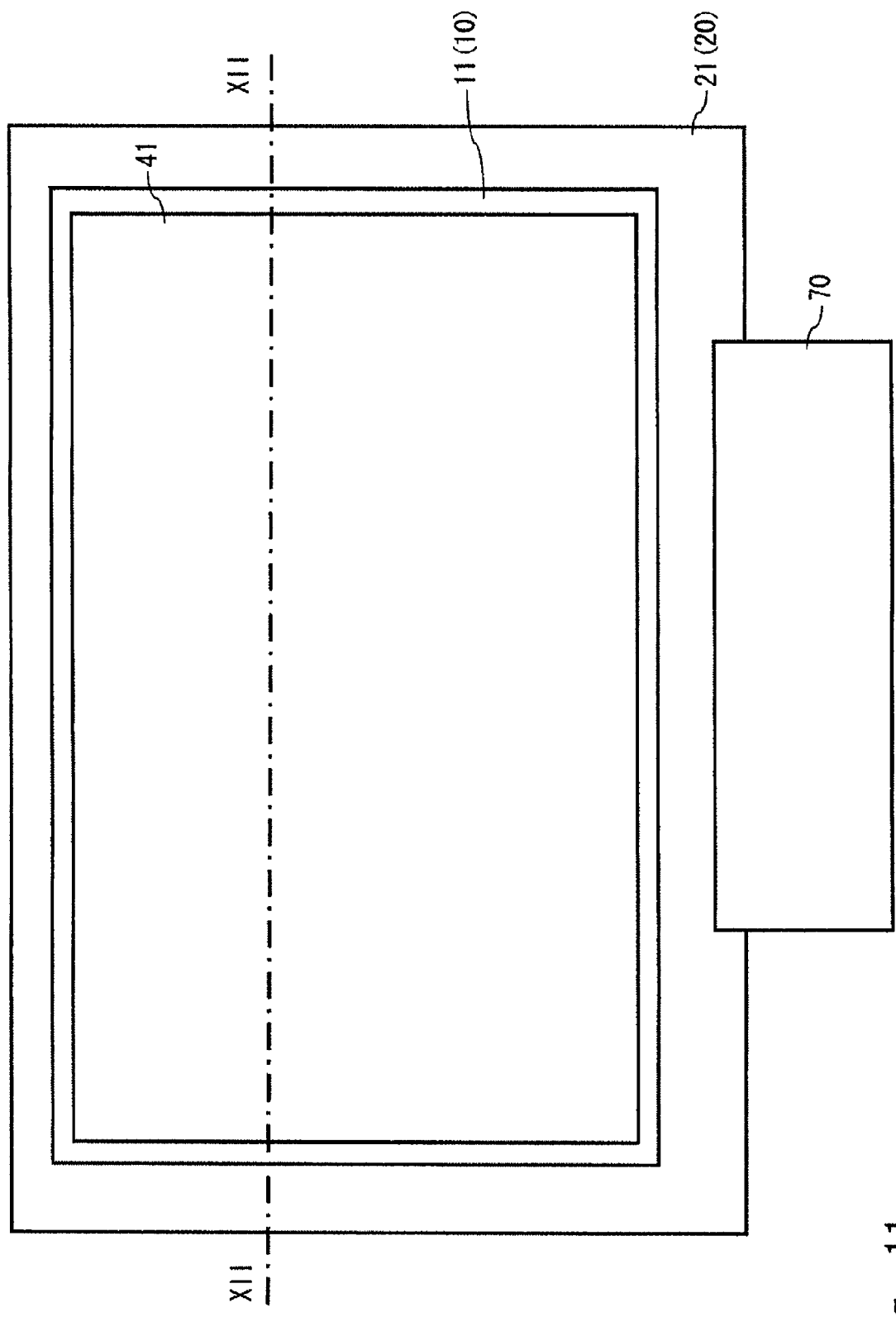
FIG. 11 is a top view showing an overall structure of a liquid crystal display device as an example of a display device according to a third exemplary embodiment of the present invention.
Figure 12:
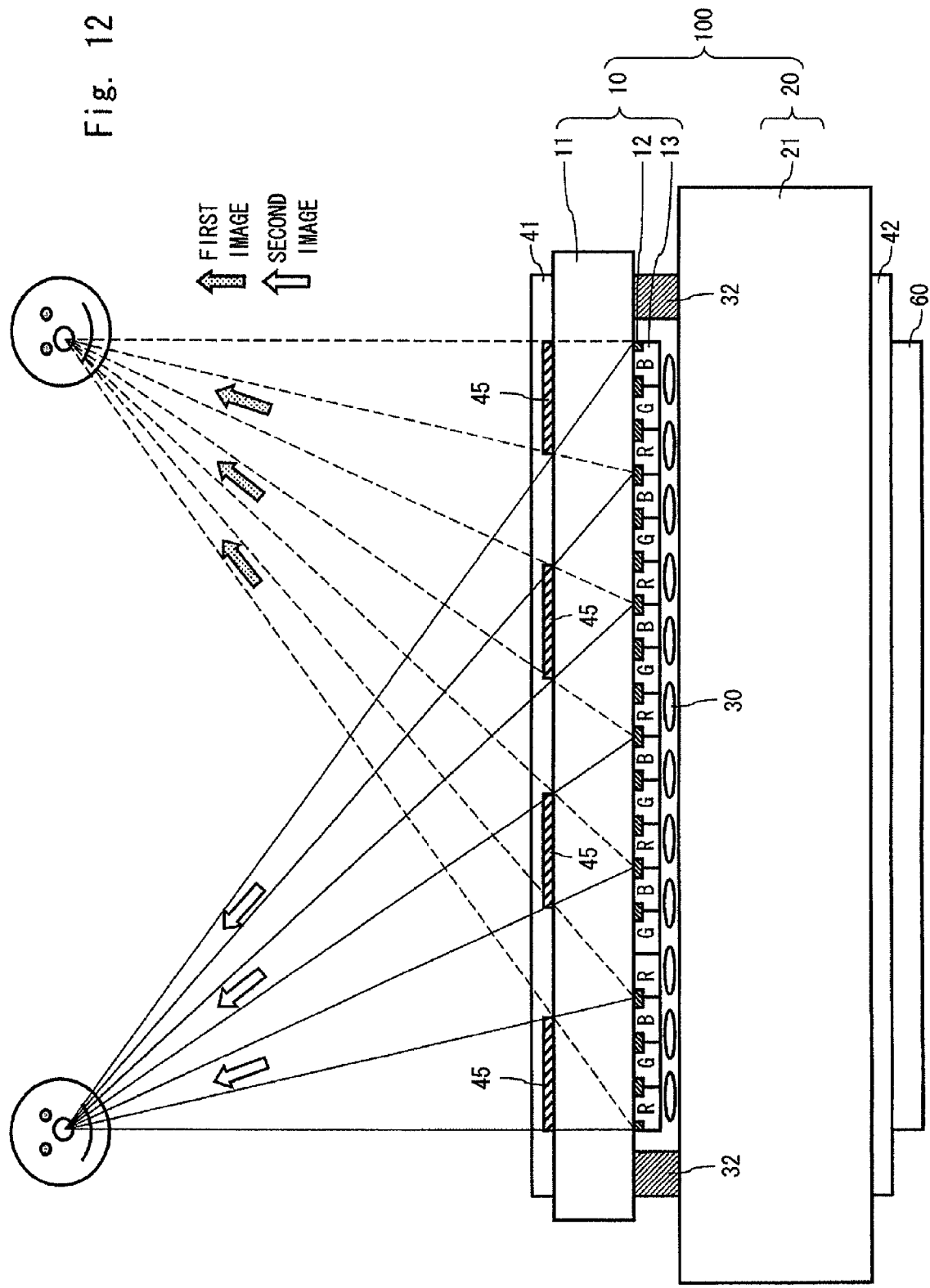
FIG. 12 is a sectional view taken along the line XII-XII of FIG. 11.
Figure 13:
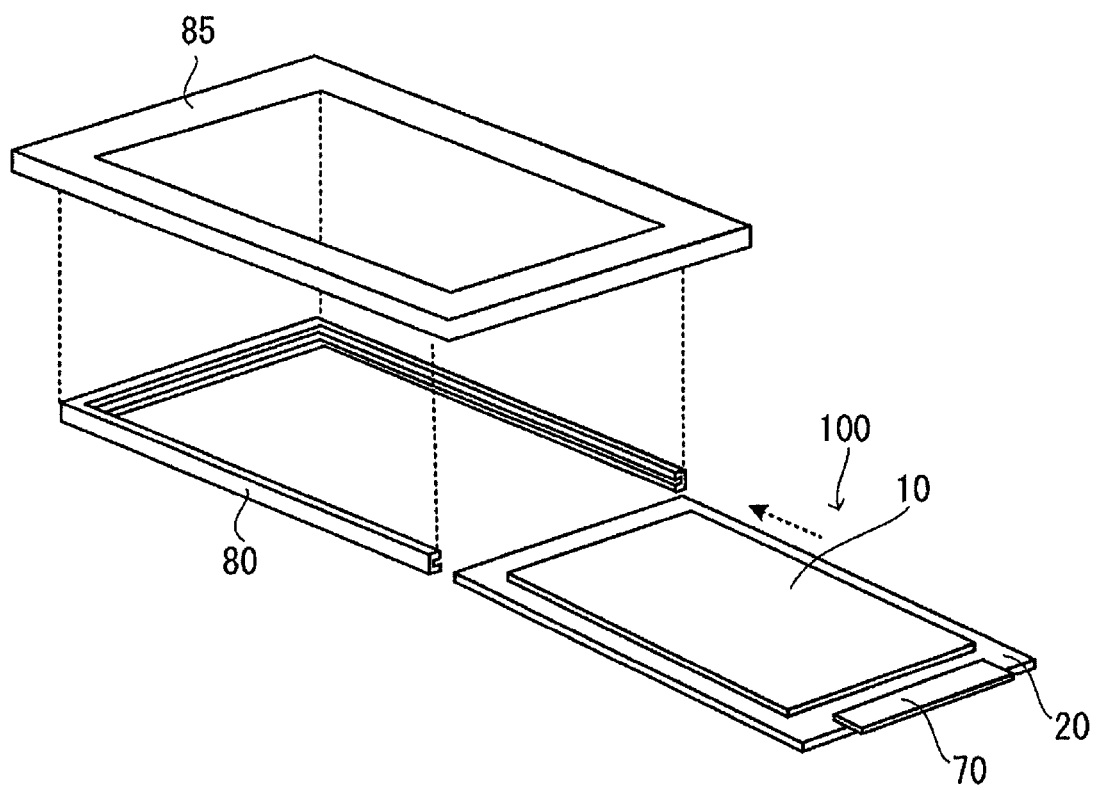
FIG. 13 is a perspective diagram to explain the relations of a holding member and a liquid crystal display panel.

A display device according to a third exemplary embodiment of the present invention will be described with reference to FIGS. 11 and 12. FIG. 11 is a top view showing an overall structure of a liquid crystal display device as an example of the display device according to the third exemplary embodiment. FIG. 12 is a sectional view taken along the line XII-XII of FIG. 11. FIG. 13 is a perspective diagram to explain the relations of a holding member and a liquid crystal display panel. Components similar to those of the liquid crystal display device of the second exemplary embodiment shown in FIG. 6 are denoted by the same reference numerals, and only differences will be described below.

As described in the second exemplary embodiment, the panels which are cut out from the cell substrate 300 after the cell substrate 300 is thinned and the parallax barrier layer 45 is formed thereon have a thickness after thinning of about 0.1 mm or 0.3 mm. Thus, the panels are liable to be damaged. For instance, when a force is applied to an edge face of the substrate by a manufacturing tool or the like or by handling during the manufacturing process after the panel division, cracking of the substrate is likely to occur starting from a fine flaw or crack which causes no problem when the substrate has a large thickness. After the liquid crystal display device is completed by mounting a circuit board, the backlight unit 60, and other constituent members to the liquid crystal display panel 100, the liquid crystal display panel 100 may come into contact with a holding member for holding the liquid crystal display panel 100 due to vibration during transportation, for example. When a force is applied to an edge face of the substrate of the liquid crystal display panel 100 by this contact, the thinned substrate is likely to be cracked. In order to solve such a problem, the third exemplary embodiment provides a structure capable of preventing a thinner substrate from being damaged.

Referring to FIGS. 11 and 12, in the liquid crystal display device according to the third exemplary embodiment, an edge side of the CF substrate 10 on which the parallax barrier layer 45 is formed and has a smaller thickness is located inside an edge side of the TFT substrate 20. Specifically, an edge side of the substrate 11 of the CF substrate 10 is located inside an edge side of the substrate 21 of the TFT substrate 20.

Further, edge sides of the CF substrate 10 are located inside edge sides of the TFT substrate 20 over the perimeter of the substrate. Specifically, not only at the edge side where a circuit member 70 such as a drive IC is mounted, but also at the edge sides other than the side where the circuit member 70 is mounted, the edge sides of the CF substrate 10 are located inside the edge sides of the TFT substrate 20. Accordingly, the CF substrate 10 having a shape smaller than the TFT substrate 20 is arranged to be included in the TFT substrate 20 when viewed in a top view. More specifically, the CF substrate 10 is opposed to the TFT substrate 20 so as not to protrude from the TFT substrate 20 when viewed in a top view, and the CF substrate 10 and the TFT substrate 20 are bonded together with a sealing material (panel sealing portions 32) interposed therebetween.

In a general liquid crystal display panel, at the edge side where the circuit member 70 such as a drive IC is mounted, the edge side of the CF substrate 10 is located inside the edge side of the TFT substrate 20, and the other edge sides of the CF substrate 10 are located at substantially the same positions as those of the TFT substrate 20. Meanwhile, in the third exemplary embodiment, at the edge sides other than the edge side where the circuit member 70 such as a drive IC is mounted, the edge sides of the CF substrate 10 are not located at substantially the same positions as those of the TFT substrate 20. Instead, the edge sides of the substrate having a smaller thickness are located inside the edge sides of the substrate having a larger thickness.

While FIGS. 11 and 12 illustrate the structure in which the substrate 11 of the CF substrate 10 has a thickness smaller than that of the substrate 21 of the TFT substrate 20, the present invention is not limited to the structure. When the substrate 21 of the TFT substrate 20 has a thickness smaller than that of the substrate 11 of the CF substrate 10, at the edge sides other than the side where the circuit member 70 such as a drive IC is mounted, the edge sides of the TFT substrate 20 having a smaller thickness are located inside the edge sides of the CF substrate 10 having a larger thickness.

Accordingly, in the third exemplary embodiment, at the edge sides other than the side where the circuit member 70 is mounted, i.e., at the edge sides of the liquid crystal display panel 100 which are in contact with the holding member 80 for holding the liquid crystal display panel 100, the edge sides of one of the CF substrate 10 and the TFT substrate 20 having a smaller thickness are located inside the edge sides of the other substrate. In other words, of the edge sides of the liquid crystal display panel 100, at the edge sides where the edge face of the substrate having a larger thickness is in contact with the holding member 80, the edge sides of the substrate having a smaller thickness are located inside the edge sides of the substrate having a larger thickness. In this manner, the edge sides of the substrate having a smaller thickness are located inside the edge sides of the substrate having a larger thickness, thereby spacing the thinner substrate apart from the holding member 80 and preventing the substrate from coming into contact with the holding member 80. A frame 85 maintains the liquid crystal display panel 100 through the holding member 80.

In the liquid crystal display device structured as described above, the panel division step (step S709 in FIG. 7) of the second exemplary embodiment may be carried out such that the edge sides of the substrate having a smaller thickness are located inside the edge sides of the substrate having a larger thickness at the edge side where the substrate comes into contact with the holding member 80 in the subsequent steps. In short, the substrate having a smaller thickness is cut inside the edges of the substrate having a larger thickness.

As described above, in the third exemplary embodiment, after formation of the cell substrate 300, the substrate is thinned, and thereafter the parallax barrier layer 45 is formed thereon. After that, when the substrate is divided into the respective panels, at the edge sides in contact with the holding member 80, the substrate having a smaller thickness is cut inside the edges of the substrate having a larger thickness. This prevents a force from being applied to the edge sides of the substrate having a smaller thickness due to contact with the holding member 80 by handling during the manufacturing process. Further, even when a vibration or an external pressure is applied after the liquid crystal display device is completed, it is possible to prevent the edge sides of the substrate having a smaller thickness from coming into contact with the holding member 80. This prevents the substrate having a smaller thickness from being damaged. Consequently, a liquid crystal display device having a higher reliability can be applied. Note that the holding member 80 is not limited to an example of FIG. 13.

The present invention is not limited to the above exemplary embodiments, but may be modified in various manners without departing from the scope of the present invention. For instance, while the first and second exemplary embodiments exemplify the active matrix type liquid crystal display device having TFTs, the present invention is not limited thereto. In other words, any display device is applicable as long as a display material, such as liquid crystal, particles, or liquid, is formed between the first substrate and the second substrate that are opposed to each other. Therefore, the present invention is also applicable to electronic paper and the like having a cell structure in which a display material is sandwiched between a pair of substrates.

While the above exemplary embodiments exemplify the case where the parallax barrier layer 45 is formed on the substrate 11 of the CF substrate 10, the parallax barrier layer 45 may be formed on the substrate 21 of the TFT substrate 20. By forming the parallax barrier layer 45 on the TFT substrate 20, the accuracy of the alignment between the parallax barrier layer 45 and the TFT substrate 20 is improved, and a high-quality display device can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a display device including a pair of substrates being opposed to each other and having a display material interposed therebetween, the method comprising the steps of:
    bonding a first mother substrate and a second mother substrate together to form a cell substrate comprising a matrix which, upon cutting in a direction transverse to the bonding plane, forms at least one panel;
    forming, after formation of the cell substrate, a parallax barrier layer for separating a display image on an outer surface of the cell substrate at a side of one of the first and second mother substrates; and
    cutting, after formation of the parallax barrier layer, the cell substrate and the parallax barrier layer in the direction transverse to the bonding plane, to form the at least one panel.

2. The method of manufacturing a display device according to claim 1, further comprising the step of thinning one of the first and second mother substrates after formation of the cell substrate and before formation of the parallax barrier layer,
    wherein in the step of forming the parallax barrier layer, the parallax barrier layer is formed on an outer surface of the cell substrate at a side of one of the first and second mother substrates thinned.

3. The method of manufacturing a display device according to claim 1, wherein in the step of forming the cell substrate, the first mother substrate and the second mother substrate are bonded together with a sealing material interposed therebetween, the sealing material including a panel sealing portion provided for each panel and a substrate sealing portion surrounding the panel sealing portion.

4. The method of manufacturing a display device according to claim 1, wherein
    the display device is a liquid crystal display device including a liquid crystal serving as the display material interposed between a color filter substrate and a thin film transistor substrate that are opposed to each other, and
    the color filter substrate and the thin film transistor substrate are obtained from the first mother substrate and the second mother substrate by the step of dividing the cell substrate into the at least one panel.

5. The method of manufacturing a display device according to claim 2, wherein
    the display device is a liquid crystal display device including a liquid crystal serving as the display material interposed between a color filter substrate and a thin film transistor substrate that are opposed to each other, and
    the color filter substrate and the thin film transistor substrate are obtained from the first mother substrate and the second mother substrate by the step of dividing the cell substrate into the at least one panel.

6. The method of manufacturing a display device according to claim 3, wherein
    the display device is a liquid crystal display device including a liquid crystal serving as the display material interposed between a color filter substrate and a thin film transistor substrate that are opposed to each other, and
    the color filter substrate and the thin film transistor substrate are obtained from the first mother substrate and the second mother substrate by the step of dividing the cell substrate into the at least one panel.

7. The method of manufacturing a display device according to claim 4, wherein in the step of forming the parallax barrier layer, the parallax barrier layer is formed of the same metal material as a black matrix for forming the color filter substrate.

8. The method of manufacturing a display device according to claim 5, wherein in the step of thinning one of the first and second mother substrates, one of the first and second mother substrates is thinned to a predetermined thickness so that a distance between a color filter layer constituting the color filter substrate and the parallax barrier layer is set to a value suitable for one of a three-dimensional display device and a dual-screen display device.

9. The method of manufacturing a display device according to claim 4, further comprising the step of bonding a polarizing plate to an outer surface of the at least one panel obtained by division, after the step of dividing the cell substrate into the at least one panel.

* * * * *